United States Patent
Chernoff et al.

(10) Patent No.: US 7,310,878 B2
(45) Date of Patent: Dec. 25, 2007

(54) AUTOMOTIVE LOWER BODY COMPONENT METHOD OF MANUFACTURE

(75) Inventors: Adrian B. Chernoff, Troy, MI (US); Richard M. Kleber, Clarkston, MI (US); Mark G. Konopnicki, Rochester, MI (US); Stephen R. Koshorek, Royal Oak, MI (US); Jacob Lyjak, Washington Township, MI (US); Chongmin Kim, Bloomfield Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 57 days.

(21) Appl. No.: 11/066,614

(22) Filed: Feb. 25, 2005

(65) Prior Publication Data
US 2005/0189791 A1 Sep. 1, 2005

Related U.S. Application Data

(60) Provisional application No. 60/548,358, filed on Feb. 27, 2004.

(51) Int. Cl.
*B23P 17/00* (2006.01)
*B23P 6/00* (2006.01)
*B21D 47/00* (2006.01)
*B21D 53/88* (2006.01)
*B21K 23/00* (2006.01)

(52) U.S. Cl. .................. 29/897.2; 29/897.1; 29/897; 29/421.1

(58) Field of Classification Search ............ 296/184.1, 296/187.08, 193.07, 204, 897, 897.1, 897.2, 296/421.1
See application file for complete search history.

(56) References Cited

U.S. PATENT DOCUMENTS

| | | | | | |
|---|---|---|---|---|---|
| 2,190,551 | A | * | 2/1940 | Swallow | 296/204 |
| 2,216,670 | A | * | 10/1940 | Milos | 296/193.07 |
| 2,230,448 | A | * | 2/1941 | Best | 296/204 |
| 2,637,592 | A | * | 5/1953 | Henning | 296/193.01 |
| 2,710,222 | A | * | 6/1955 | Bela | 296/204 |
| 2,882,588 | A | * | 4/1959 | Rieppel et al. | 29/890.042 |
| 3,054,636 | A | * | 9/1962 | Wessells | 296/204 |
| 3,596,979 | A | * | 8/1971 | Hablitzel et al. | 296/181.2 |
| 4,428,599 | A | * | 1/1984 | Jahnle | 280/784 |
| 4,887,862 | A | * | 12/1989 | Bassi | 296/204 |
| 5,129,700 | A | * | 7/1992 | Trevisan et al. | 296/193.07 |
| 5,259,660 | A | * | 11/1993 | Haesters | 296/204 |
| 5,787,585 | A | * | 8/1998 | Rashid | 29/897.2 |
| 5,860,694 | A | * | 1/1999 | Seefried et al. | 296/203.03 |
| 5,921,618 | A | * | 7/1999 | Mori et al. | 296/187.12 |
| 5,974,847 | A | | 11/1999 | Saunders et al. | 72/57 |

(Continued)

*Primary Examiner*—David P. Bryant
*Assistant Examiner*—Christopher M Koehler

(57) ABSTRACT

A method for manufacturing a lower body component for a vehicle is provided including forming a one-piece floor pan at least partially defining a vehicle passenger compartment and substantially extending longitudinally at least the entire length thereof, and forming a one piece reinforcement structural member for reinforcing the pan. The method also includes simultaneously forming the pan and one-piece reinforcement structural member by stacking a pair of weldable sheet metal blanks sufficiently close together to define a comon interface, positioning the stacked blanks between moveable profile forming dies, heating the dies so that the blanks reach a superplastic forming temperature, and plastically deforming the stacked blanks into a lower body component having the profile of the dies. The method also includes friction stir welding of the stacked blanks at the common interface.

6 Claims, 2 Drawing Sheets

U.S. PATENT DOCUMENTS

| | | | |
|---|---|---|---|
| 6,073,991 A * | 6/2000 | Naert .................... 296/187.02 |
| 6,126,219 A * | 10/2000 | Wilkinson et al. ....... 296/26.01 |
| 6,253,588 B1 | 7/2001 | Rashid et al. .................. 72/57 |
| 6,450,396 B1 | 9/2002 | Krajewski .................. 228/193 |
| 6,547,895 B2 | 4/2003 | Bradley et al. ............. 148/535 |
| 6,550,124 B2 | 4/2003 | Krajewski et al. ............ 29/423 |
| 6,604,781 B2 * | 8/2003 | Uchida ....................... 296/204 |
| 6,675,621 B2 | 1/2004 | Kleber et al. .................. 72/60 |
| 6,694,790 B2 | 2/2004 | Ryntz et al. ................... 72/60 |
| 6,825,442 B2 | 11/2004 | Schroth et al. ............. 219/137 |
| 2002/0108229 A1 * | 8/2002 | Rosch ....................... 29/421.1 |
| 2002/0166222 A1 * | 11/2002 | Kojima et al. ............. 29/421.1 |

* cited by examiner

AUTOMOTIVE LOWER BODY COMPONENT METHOD OF MANUFACTURE

CROSS REFERENCE TO RELATED APPLICATIONS

This Application claims the benefit of U.S. Provisional Application No. 60/548,358, filed Feb. 27, 2004, which is hereby incorporated by reference in its entirety.

TECHNICAL FIELD

This invention relates to a lower body component of a vehicle having a one-piece floor pan extending substantially longitudinally at least the entire length of the vehicle passenger compartment.

BACKGROUND OF THE INVENTION

A typical prior art vehicle body requires a plurality of components to form and define the lower body component of the vehicle. For instance, a lower body component typically includes a floor pan assembly that is formed by joining together individual components. Each component or panel would have its respective forming tool and corresponding fixtures for assembly.

The floor pan assembly is generally reinforced by attaching structural members to enhance vehicle rigidity. The floor pan reinforcement is typically formed by joining together separate sheet metal components. Each of these components requires a number of separate assembly and welding or other connecting processes to connect to the vehicle.

SUMMARY OF THE INVENTION

By utilizing fluid forming techniques such as quick plastic forming (QPF), superplastic forming (SPF) and sheet hydroforming processes, vehicle components may be consolidated, thus simplifying processing and assembly. For instance, a lower body component may be formed with a one piece floor pan. Structures may take on more complex forms, utilizing materials that may enable potential improvements in fuel economy. Vehicle components formed using quick plastic forming (QPF) processing may be comprised of metallic and other materials that meet styling, functionality and performance requirements.

In one aspect of the invention, a lower body component is provided that comprises a one-piece floor pan at least partially defining a vehicle passenger compartment and where the floor pan substantially extends longitudinally at least the entire length of the vehicle passenger compartment.

In another aspect of the invention, the one-piece floor plan at least partially defines the rocker inner portion of the vehicle, the front and rear foot wells, the tunnel portion, the rear wheel housing portion, the rear load floor, the rear seat pan and the spare tire well portion of the vehicle.

In another aspect of the invention, the one piece floor pan is reinforced with a one piece reinforcement structural member. The reinforcement structural member may be formed to at least partially define at least one seat mounting beam and the tunnel portion of the vehicle.

In another aspect of the invention, a method of manufacturing a lower body component is provided. A fluid forming technique, such as QPF and SPF is employed to form the one-piece floor pan from a single sheet metal blank. The fluid-forming technique is preferably augmented by forming techniques such as plural sheet forming, multilayer patch forming, multi-material forming or tailor welded blank forming to simultaneously form any required reinforcement structural members from individual sheet metal blanks during the forming of the one-piece floor pan. The method may further include joining of the structural members with the one-piece floor pan either prior to or subsequent to the simultaneous formation.

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENTS

Figure 1:
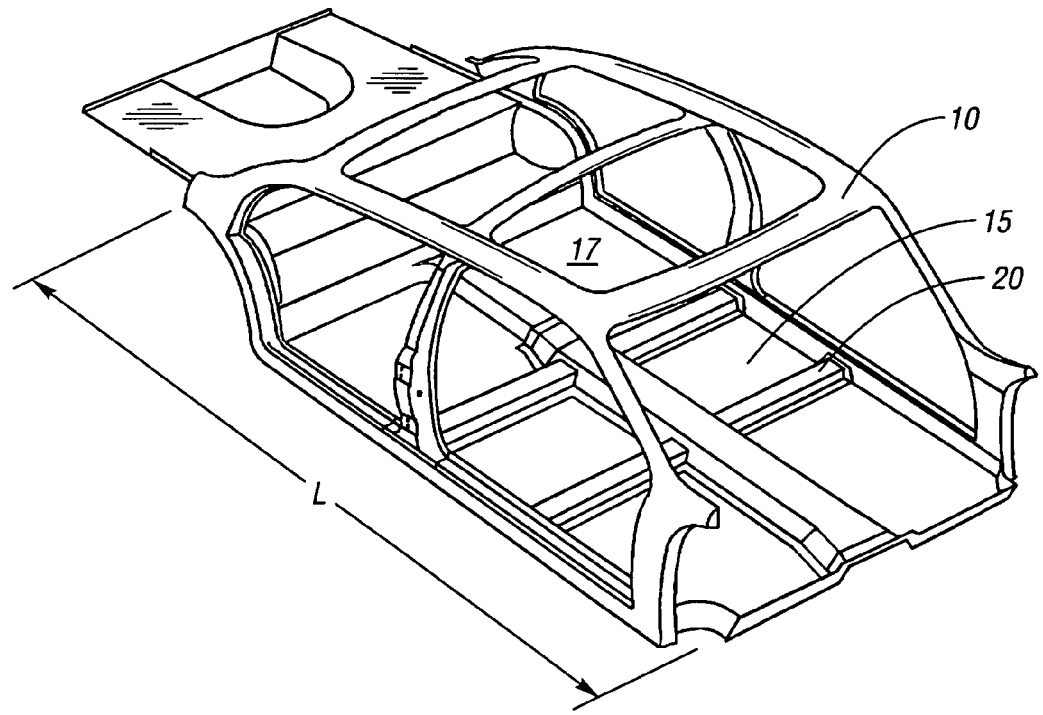
FIG. 1 is a schematic perspective view of an upper and lower body component of a vehicle with a one piece floor pan and one piece reinforcement structural member.

FIG. 1 is a schematic perspective depiction of an automotive structure with an upper body 10 and a lower body one piece floor pan 15. The one piece floor pan substantially extends longitudinally at least the entire length L of the vehicle passenger compartment 17. The one piece floor pan is preferably reinforced with a one-piece reinforcement structural member 20 to provide structural rigidity.

Figure 2:
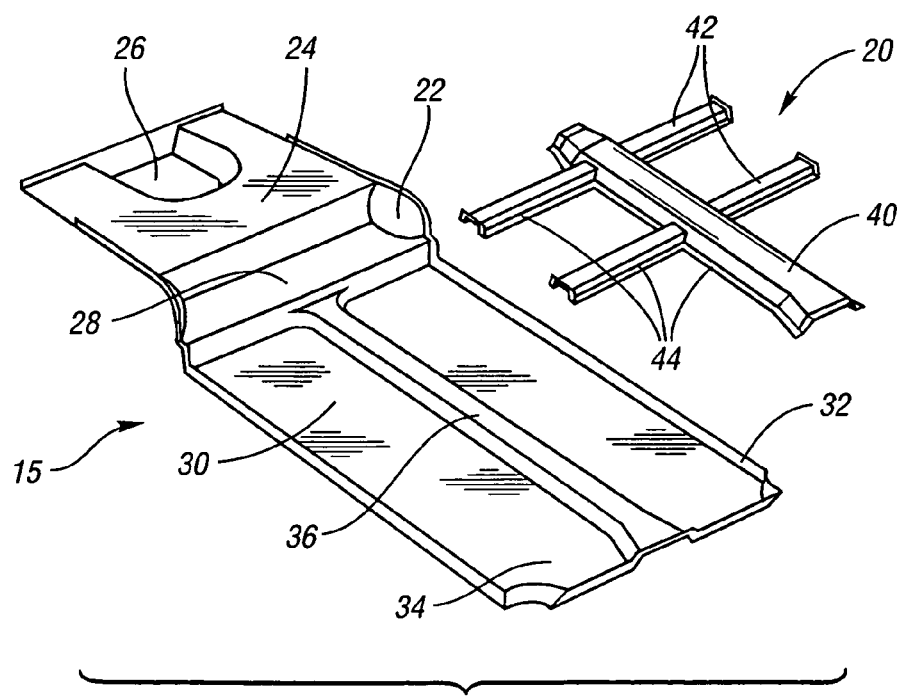
FIG. 2 is an exploded view of a one piece floor pan and one piece reinforcement structural member, sometimes called a spider.

In FIG. 2, an exploded view of the one-piece floor pan 15 and one-piece reinforcement structural member 20 is shown. The one-piece floor pan 15 is characterized by the rear wheel housing portion 22, a rear load floor 24, a spare tire well 26, a rear seat pan 28, rear foot wells 30, rocker inner portion 32 and front foot wells 34. Typically, each of these areas would be a separate panel, with its respective forming tools and assembly fixtures. The consolidation into a one-piece floor pan reduces the number of forming tools and eliminates the need for most of the weld fixtures. The one-piece floor pan 15 is also characterized by a tunnel portion 36 which allows for the under car passage of vehicle components and functions.

FIG. 2 illustrates the reinforcement structural member 20. Typically, the floor pan reinforcement would consist of a plurality of individual sheet metal components that are joined together. Each of these components would require a number of separate forming or assembly processes as well as connecting processes such as welding to connect to the vehicle. The use of fluid-forming techniques such as QPF, SPF and sheet hydroforming processes enables the consolidation of these components and the simplification of assembly processes. The one-piece reinforcement structural member 20 shown here consolidates the tunnel reinforcement 40, the four-seat mounting beams 42, and perimeter weld flanges 44 into a unitary piece.

The one piece floor pan 15 and the one-piece reinforcement structural member 20 may be welded together to form a complete floor structure along the perimeter weld flange 44. The floor pan and the reinforcement member may be welded or otherwise joined from separate sheets after forming or joined selectively prior to forming.

The one-piece floor pan 15 may be attached to other structural components such as the front frame rails (not shown) and suspension shock towers (not shown). A consolidation of parts and reduction in the number of forming tools may result from the integration of the front frame rails (not shown) and suspension shock towers (not shown) into a unitary structure. Similar consolidations may be achieved in the engine cradle, discussed below and shown in the provisional application which is incorporated herein by reference, and the rear frame rail assemblies (not shown).

Those skilled in the art will recognize a variety of materials that may be employed to form the one piece floor pan and one-piece reinforcement structural member, including various metals and plastics. Those skilled in the art will also recognize a variety of forming techniques that may be employed within the scope of the claimed invention, such as, but not limited to, stamping, injection molding, etc. However, a fluid forming technique such as quick plastic forming, superplastic forming, or sheet hydroforming is preferably employed to form the one piece floor pan and the one-piece reinforcement structural member. A number of these techniques are described hereinafter.

Single Sheet QPF

Quick plastic forming (QPF) is described in U.S. Pat. No. 6,253,588, issued Jul. 3, 2001 to Rashid, et al and commonly assigned to General Motors, which is hereby incorporated by reference in its entirety. For quick plastic forming, a preferred alloy is Aluminum Alloy 5083 having a typical composition, by weight, of about 4% to 5% magnesium, 0.3 to 1% manganese, a maximum of 0.25% chromium, about 0.1% copper, up to about 0.3% iron, up to about 0.2% silicon, and the balance substantially all aluminum. Generally, the alloy is first hot and then cold rolled to a thickness from about one to about four millimeters.

In the AA5083 alloys, the microstructure is characterized by a principal phase of a solid solution of magnesium in aluminum with well-distributed, finely dispersed particles of intermetallic compounds containing the minor alloying constituents, such as $Al_6Mn$.

Using QPF, large AA5083-type aluminum-magnesium alloy sheet stock may be formed into a complex three-dimensional shape with high elongation regions, like a super-plastic formed (SPF) (discussed below) part, at surprisingly higher production rates than those achieved by SPF practices. The magnesium-containing, aluminum sheet is heated to a forming temperature in the range of about 400° C. to 510° C. (750° F. to 950° F.). The forming may often be conducted at a temperature of 460° C. or lower. The heated sheet is stretched against a forming tool and into conformance with the forming surface of the tool by air or gas pressure against the back surface of the sheet. The fluid pressure is preferably increased continuously or stepwise from 0 psi gage at initial pressurization to a final pressure of about 250 to 500 psi (gage pressure, i.e., above ambient pressure) or higher. During the first several seconds up to about, e.g., one minute of increasing pressure application, the sheet accommodates itself on the tool surface. After this initial period of pressurization to initiate stretching of the sheet, the pressure can then be increased at an even faster rate. Depending upon the size and complexity of the panel to be formed, such forming can normally be completed in a period of about two to twelve minutes, considerably faster than realized in superplastic forming. Thus, by working a suitably fine grained, aluminum alloy sheet at significantly lower temperatures and continuously increased, higher gas pressures than typical SPF practices, significantly faster and more practical forming times are achieved for the parts described herein and their equivalents. This particular QPF process described in U.S. Pat. No. 6,523,588 may be referred to as "single sheet" QPF.

Superplastic Forming (SPF)

Where time is not of the essence, the one piece floor pan and reinforcement structural member may also be formed by superplastic forming (SPF), as described in U.S. Pat. No. 5,974,847, issued Nov. 2, 1999 to Saunders, et al and commonly assigned to General Motors, which is hereby incorporated by reference in its entirety. When certain alloy compositions of steel or aluminum are suitably processed (such as with a very fine grain microstructure), they exhibit superplastic behavior at certain elevated temperatures. When deformed at these temperatures, the ductility (or elongation before yield or failure) of these materials exceeds several hundred percent. Such high levels of ductility can enable fabrication of very complex structures in a single sheet of material.

Materials

In addition to various steels and aluminum alloys, other structural materials such as zinc, brass, magnesium, titanium and their alloys have also been known to exhibit superplastic behavior. These materials and other metal matrix composites could also be used to make the one piece floor pan and reinforcement structural member, if desired.

In an example of superplastic forming, a blank, i.e., a sheet, is tightly clamped at its edges between complementary surfaces of opposing die members. At least one of the die members has a cavity with a forming surface opposite one face of the sheet. The other die opposite the other face of the sheet forms a pressure chamber with the sheet as one wall to contain the working gas for the forming step. The dies and the sheet are heated to a suitable SPF condition for the alloy. For SPF aluminum alloys, this temperature is typically in the range of 400° C. to 550° C. Electric resistance heating elements are located in press platens or sometimes embedded in ceramic or metal pressure plates located between the die members and the platens. A suitable pressurized gas such as argon or air is gradually introduced into the die chamber on one side of the sheet, and the hot, relatively ductile sheet is stretched at a suitable rate until it is permanently reshaped against the forming surface of the opposite die. The rate of pressurization is controlled so the strain rates induced in the sheet being deformed are consistent with the required elongation for part forming. Suitable strain rates are usually 0.0001 to 0.01 s-1. During the deformation of the sheet, gas is vented from the forming die chamber.

The '847 patent provides a method of stretch forming a ductile metal sheet into a complex shape involving significant deformation without excessive thinning of the sheet material and without tearing it. The method is particularly applicable to the stretch forming of superplastic alloys heated to a superplastic forming temperature. In the method, additional material from the initially flat sheet blank is pulled or drawn into the forming cavity for stretch forming. The additional material significantly reduces thinning and tearing in the formed part.

The method contributes to thickness uniformity in an SPF stretch-formed component by utilizing controlled draw-in of sheet metal to the forming chamber prior to application of gas pressure. In an illustrative practice, a preform, similar to a stationary male punch, is placed on the forming press platen opposite the die cavity. An aluminum blank, for example, is placed over the insert and heated to a suitable SPF temperature for the alloy. The die is then moved toward its closed position against the platen. In its closing motion, the die engages the edges of the aluminum sheet. The heated metal is pulled over and around the insert, and draw-in of blank material thus occurs. This results in a greater amount of metal in the die cavity prior to SPF blow forming. The quantity of additional metal can be managed by design of the size, shape and location of the preform on the platen or complementary die member. But the additional metal in the die cavity reduces the amount of strain required and, hence, the amount of thinning to form a desired geometry compared to conventional SPF.

Thus, by the judicious use of a suitable space-occupying metal preform on a die or platen member opposite the forming die, additional metal is easily drawn into the cavity during die closure without significantly increasing the complexity of the tooling. Care is taken in the design of the preform to avoid excessive wrinkling of the drawn-in metal and to maintain a tight gas seal at the periphery of the sheet upon full die closure. The uniformity in thickness of the stretch-formed part is improved. Mass of the formed part can be reduced because the designer does not need to resort to thicker blanks to assure part quality. And, except for the simple preform, there is no increase in the complexity of the SPF tooling.

Other Techniques

Those skilled in the art will recognize various adjunct techniques to augment the above fluid forming techniques. Such adjuncts include plural sheet forming, multi-layer patch forming, multi-material forming and tailor welded blank forming, which allow for simultaneous formation of members in the same tool. Some applicable processes are briefly summarized below.

Two Sheet, Opposite Direction Formation

The one-piece floor pan 15 and reinforcement structural member 20 may be formed using a plural sheet forming process in which the one-piece floor pan 15 and reinforcement structural member 20 are simultaneously formed to the respective shapes of opposing dies by directing pressurized air or gas between the blanks, forcing the blanks in opposite directions toward the opposing dies. Such a process is described in U.S. Pat. No. 6,675,621, issued Jan. 13, 2004 to Kleber and commonly assigned to General Motors, which is hereby incorporated by reference in its entirety. By forming the one-piece floor pan 15 and one-piece reinforcement structural member 20 simultaneously in a pair of dies, the output of the superplastic forming equipment, including the dies, is multiplied for improved efficiency. The '621 patent provides for simultaneous formation of at least two sheets of superplastic formable blanks into two separate components from the same pressurization.

Turning now in greater detail to the remaining drawings, FIGS. 3 through 6 are cross sectional views which depict stages in the two sheet, opposite direction formation process in which the one-piece floor pan 15 is simultaneously formed with the reinforcement structural member 20 to create the lower body component shown in FIG. 2.

Figure 3:
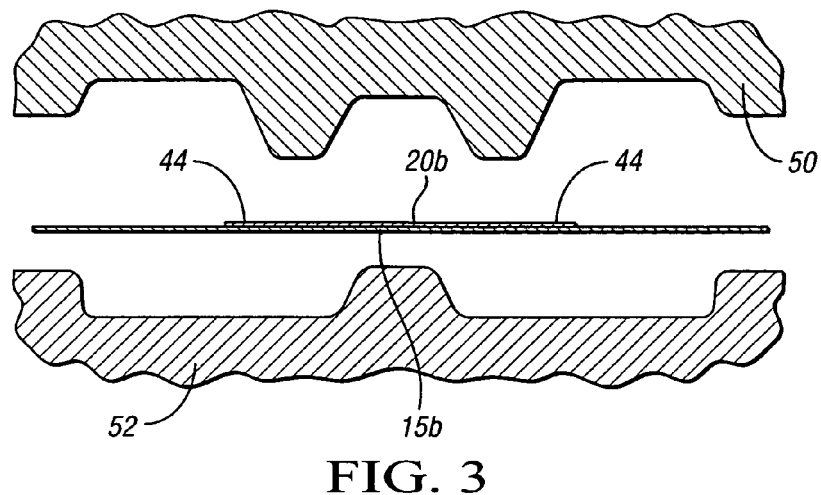
FIG. 3 is a cross-sectional view of a forming tool with sheet metal blanks inserted.

FIG. 3 is a cross sectional view of a forming tool with a movable upper tool die 50 and movable lower tool die 52. The tool is in the open position with two superplastic formable sheet metal blanks 15b and 20b inserted in the tool environment in preparation for forming. A lower blank 15b for the one-piece floor pan 15 is positioned between the upper and lower forming dies, 50 and 52. An upper blank 20b for the reinforcement structural member 20 is placed directly on top of the lower blank 15b. The sheets are stacked closely together to define a common interface therebetween. The sheet metal blanks may be welded together with a perimeter weld along the entirety of the perimeter weld flange 44 with the exception of a small length of perimeter to allow for pressurization between the blanks. The upper and lower sheet metal blanks 20b and 15b may be welded or otherwise joined either after forming or prior to forming. The forming dies 50 and 52 are heated so that the temperature of the pair of sheet metal blanks reaches a temperature for superplastic forming.

Figure 4:
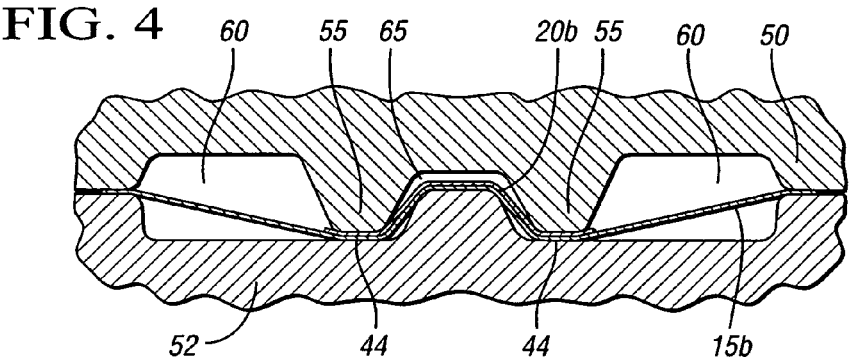
FIG. 4 is a cross-sectional view of the forming tool and partially formed sheet metal blanks after closure of the forming tool and before pressurization of the tool.

FIG. 4 is a cross-sectional view of the forming tool and partially formed sheet metal blanks after closure of the upper and lower dies and before pressurization of the tool. As the upper tool die 50 is closed, it deforms the sheet metal blanks 15b and 20b, as illustrated in FIG. 4. The lowest sealing feature or contour 55 of the upper tool die 50 urges the blanks against the lower tool die 52 and a seal is established at their common interface that partially encompasses or defines an internal chamber between the sheet metal blanks. The sealing creates separate pressurization chambers inside the forming tool dies 50 and 52; a perimeter pressurization chamber 60 outside the lowest sealing feature 55 and an internal pressurization chamber 65 inside the lowest sealing feature 55, allowing for different pressurization inside and outside the sealing feature 55.

Figure 5:
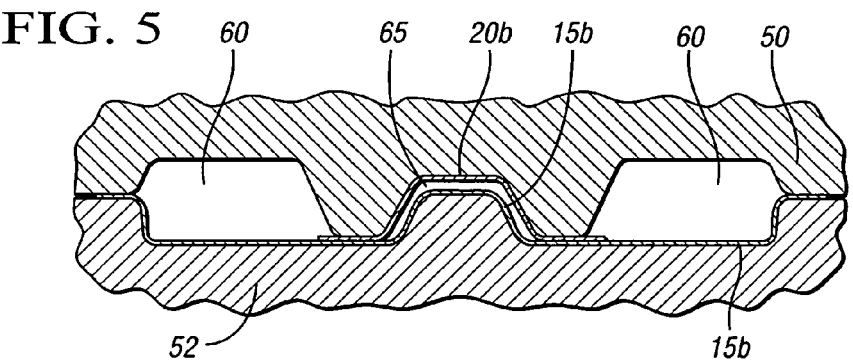
FIG. 5 is a cross-sectional view of the forming tool and completely formed sheet metal blanks after the pressurization of the tool and complete forming of the blanks.

FIG. 5 is a cross-sectional view of the forming tool and completely formed sheet metal blanks after the pressurization of the tool and complete forming of the blanks. Pressurized air or gas is introduced into both internal chambers to increase their volumes to simultaneously effect the stretching of the sheet metal blanks into the upper and lower profiling dies 50 and 52 and to thereby plastically form the sheet metal blanks into the one-piece floor pan 15 and reinforcement structural member 20, having the profile of the forming dies. For instance, a pressurization wedge (not shown here but described in the '621 patent) may be moved from one side of the overlying sheets to a fluid sealing or stopper position between the sheets and in which a forward edge portion of the upper sheets is displaced upwardly to define a gas entry way between the two blanks and to complete the pressure sealing of the air space between the blanks. Pressurized air or gas may then be entered through at least one fluid conducting passage (not shown) formed through the wedge and within the bounds of the pressure sealing of the two heated sheets that effects the simultaneous displacement of the sheets from one another onto the forming dies to form the one piece floor pan and one-piece reinforcement structural member.

Within the confines of perimeter pressurization chamber 60, the pressurization urges the floor pan blank 15b against the contours of the lower tool portion 52 to form the contours of the floor pan 15 of FIG. 2. Simultaneously, within the confines of the internal pressurization chamber 65, pressurization is introduced between the blanks. The pressurization forces the floor pan blank 15b against the contours of the lower tool portion 52 to form the remaining portions of the one-piece floor pan 15. The same pressurization urges the reinforcement structural member blank 20b against the contours of the upper tool die 50 to form the reinforcement structural member 20 of FIG. 2.

Figure 6:
FIG. 6 is a cross-sectional view of the reinforced floor pan after removal from the forming tool.

FIG. 6 shows a cross section of the same components as FIGS. 4 and 5 after the pressurization of the die and complete forming of the blanks. The upper and lower dies are opened and the seal is broken, and the completely formed one piece floor pan 15 and reinforcement structural member 20 are removed from the profiling dies. The upper and lower blanks have completely formed their design features and are now the one-piece floor pan 15 and reinforcement structural member 20.

A process for simultaneously forming two superplastic formable parts to upper and lower die halves is described in U.S. Pat. No. 6,694,790, issued Feb. 24, 2004 to Ryntz et al. and commonly assigned to General Motors, which is hereby incorporated by reference in its entirety. The '790 patent utilizes a mid-plate that supports and separates the upper and lower sheet metal blanks between forming dies. An inner chamber is formed by the mid-plate. Pressurized gas is introduced into the inner chamber, thereby expanding the sheets away from one another onto structure of the dies to simultaneously form discreet parts reflective of the upper and lower forming surfaces. This method utilizing a mid-plate may be used with a die having equivalent upper and lower surfaces, thus providing duplicate parts with each pressurization or the upper and lower dies may have differing forming surfaces, thus forming two different parts with each pressurization (such as an upper reinforcement portion and a lower floor pan portion).

Thus, the two sheet, opposite direction processes disclosed in the '621 patent and in the '790 patent allow for efficient superplastic or quick plastic forming of automotive components.

Tailor Welded Blanks

A vehicle structure or accessory may be formed as a multi-thickness, single membrane under a fluid forming process such as hydroforming, SPF, or QPF. Under these processes, one or both of the upper and lower sheet metal blanks of FIG. 3 may be formed by the tailor welded blank process described in U.S. Pat. No. 6,825,442, issued Nov. 30, 2004 to Schroth et al. and commonly assigned to General Motors Corporation, which is hereby incorporated by reference in its entirety. The tailor welded blank process described in the '442 patent allows tailor welded blanks having sheet elements with different values of a physical characteristic, such as sheet thickness, to be processed successfully into components. Many alloy systems including, but not limited to, steel, aluminum, magnesium and titanium materials may be processed to form the tailor welded blank. Hydroforming, SPF and QPF may be used to form the tailor welded blank. The tailor welded blank process utilizes a blank that has variations in the thickness of sheet elements that is amenable to forming in a fluid forming process to large relative strains and consequently into complex shapes. The sheet elements that form the tailor welded blank deform at nearly the same rate even though they have different values of a physical characteristic, such as different thicknesses or different material strength values.

Patch Reinforcement Process

The patch reinforcement process described in U.S. Pat. No. 6,550,124, issued Apr. 22, 2003 to Krajewski, et al. and commonly assigned to General Motors, which is hereby incorporated by reference in its entirety, may be utilized in the formation of the one-piece floor pan 20 and one-piece reinforcement structural member 25. U.S. Pat. No. 6,550,124 provides a method of locating and temporarily bonding a sheet metal reinforcing piece or patch to another sheet metal blank prior to an SPF operation (including the QPF operation of U.S. Pat. No. 6,253,588) on the two sheet layers. The smaller piece or patch is positioned and bonded on the blank sheet to undergo the same deformation as the adjacent blank sheet region that is intended to be reinforced or otherwise benefited by the patch. Generally, the secondary piece or patch is removed after the forming operation for later permanent attachment (i.e., by welding or other means) to the formed blank or similar piece. Water glass, i.e., a water soluble glassy substance comprising sodium silicate, is used to attach the reinforcing piece of metal to the SPF blank prior to fluid forming. The water glass is stable and non-reactive at elevated temperatures, allowing it to withstand the superplastic forming environment without degradation of the metal sheets, and to release the sheets from one another after forming. Such reinforcing patches may be employed to provide strengthening formations to a panel.

U.S. Pat. No. 6,547,895, issued Apr. 15, 2003 to Bradley et al. and commonly assigned to General Motors, which is hereby incorporated by reference in its entirety, discloses a method of forming multi-layer patches by a specific fluid forming process for patching or reinforcing a main sheet. As disclosed in the '895 patent, multi-layer patches may be formed simultaneously by an SPF or QPF process such that the separate patch layers closely fit the adjoining portion of the main layer. The reinforcing patches may be spot welded or otherwise joined to the main sheet but preferably they are formed without becoming diffusion bonded during the forming process itself. Final joining of the sheets, if required, is accomplished after the forming process. Utilization of the multi-formed patch process of the '895 patent facilitates a thicker, SPF or QPF formed part than with single sheet processing, with minimal defects and often in a shorter processing time.

Multi-Material Components

If desired, an automotive structure, such as the one piece floor pan and reinforcement structural member, may be formed of differing materials using a QPF forming process. For instance, the magnesium/aluminum bonded components may be formed by the method described in U.S. Pat. No. 6,450,396, issued Sep. 17, 2002 to Krajewski and commonly assigned to General Motors. In this instance, the floor pan is formed from a first substrate and a second substrate. The first substrate includes at least 90 weight percent aluminum in the first set of additives, magnesium being the dominant constituent in the additives. The second substrate includes at least 85 weight percent magnesium and a second set of additives, aluminum being the dominant constituent of the second set of additives. The first and second substrates are heated to an elevated temperature as described in the '396 patent. Pressure is applied to the substrates at least at one point of contact to bond the substrates to one another. An upper sheet metal blank may be the first aluminum dominant substrate and the lower sheet metal blank may be the second magnesium dominant substrate. By undergoing the bonding process described in the '396 patent, the two portions may be diffusion bonded to one another at adjacent areas by undergoing the process of the '396 patent.

Multi-Material Tailor Welded Blank

A body structure such as the one piece floor pan may be formed from sheet elements of two different materials that are tailor welded together at respective edges thereof and then subjected to a QPF, or SPF or warm forming process.

Accordingly, different materials are tailor welded to form a single blank, and are then formed together in the same die under a fluid forming process. A continuous, complex shape is obtained. Different portions of the single sheet have different material properties (such as strength) dependent upon which of the originally separate (but tailor welded together) multiple materials form the respective portions.

Two separate pieces of sheet material, a first sheet (preferably aluminum (AA5083)) and a second sheet (preferably magnesium (AZ31B)) are welded to one another to form a single blank. The sheets may have the same or different thicknesses, depending on strength and stiffness requirements of corresponding areas in the formed part. Preferably, friction stir welding is used to join the sheets. Friction stir welding enables a reliable weld region, without forming the brittle intermetallic phase associated with a molten, mixed and resolidified area of mixed metals at the weld region, typically encountered with other welding processes. The blank may be subjected to QPF, SPF or other elevated temperature forming processes to form, for example, an automotive body or frame structure. The weld region retains superplastic properties.

Two blanks of differing materials, for instance an aluminum alloy blank and a magnesium alloy blank may also be welded at a periphery (preferably by friction stir welding) and then subjected to a QPF, SPF or other fluid forming, elevated temperature process involving pressurization between the blanks.

QPF and SPF Forming of Multi-Sheet Metallic Structure Using a Stack of Blanks Pre-Joined by Friction Stir Welding A vehicle component such as one piece floor pan and one piece reinforcement structural member may be formed from multiple sheets. The sheets may begin as flat, stacked sheets that are friction stir welded to one another. Friction stir welding is a solid state joining process that produces ultra fine microstructure in titanium and aluminum alloys upon in-process dynamic recrystallization or subsequent annealing treatment. Those skilled in the art will readily understand friction stir welding. The friction stir welding technique may be applied to aluminum alloys, magnesium alloys and titanium alloys. Portions of a stack of sheet blanks are friction stir welded to one another at selected areas, prior to SPF or QPF forming of the sheets. High temperature gas pressure forming produces a multi-sheet structure with complex internal structures. The resulting multi-layer structure exhibits great stiffness and strength.

Metallic Foam Forming Process

The one piece floor pan and reinforcement structural member may be formed by a method of metallic sandwiched foam composite forming as described in A Method of Metallic Sandwiched Foam Composite Forming, U.S. patent application Ser. No. 10/738,345, commonly assigned to General Motors Corporation, filed Dec. 17, 2003 by Morales et al., and hereby incorporated by reference in its entirety, or by a method for producing in situ metallic foam components, as described in Method for Producing In Situ Metallic Foam Components, U.S. patent application Ser. No. 10/738,884, commonly assigned to General Motors Corporation, filed Dec. 17, 2003 by Morales et al., and hereby incorporated by reference in its entirety. The sandwiched foam composite forming method involves subjecting a planar metal sheet to an SPF or QPF process. Either during or after the SPF or QPF processing of the sheet metal, a composite structure is formed by coupling a metal foam layer to the formed metallic sheet. As described in application Ser. No. 10/738,345, the coupling of the metallic foam to the QPF or SPF metal sheet may be accomplished by using adhesives or brazing materials which are deposited between the deformed metallic sheet and the foam substrate. In addition, the QPF or SPF formation of the sheet metal may include forming a pair of locking interfaced surfaces which can be elastically deformed to engage a pair of sculpted surfaces on the foam material.

The foam substrate may be coupled to the QPF or SPF sheet during the QPF or SPF forming process. In that case, the foam substrate is sculpted prior to forming and is inserted into a QPF die with the unformed sheet metal. QPF or SPF may then be applied to deform the metal sheet about the sculpted foam. Alternatively, the formation of the foam substrate may occur during the SPF or QPF processing of the sheet metal. When the composite structure is formed, the foam substrate can then be adhered to the sheet metal by fusion or with the use of braze material disposed in the construction. Alternatively, the coupling may occur by mechanical interaction or fusion coupling of the foam to the sheet metal. Finally, the foam substrate may be bonded to the sheet metal prior to the QPF or SPF processes. As described in application Ser. No. 10/738,345, SPF and QPF may be used to form foam, a one sided sandwich foam composite (i.e., sheet metal on only one side of the foam) or a two sided sandwich foam composite (i.e., foam having a sheet metal on either side). The foam, the one sided or the two sided sandwich foam composite, is then processed by QPF or SPF within a die or forming tool such that the foam or sandwich panel conforms to the shape of the die or tool forming surface.

As described in application Ser. No. 10/738,884, a method for producing in situ metallic foam components may be used in forming the one piece floor pan and reinforcement structural member. Foam precursor materials formed from a mixture of metal powders (elementary metal powders, alloy powder or a metal powder blend) and a blowing agent (for example, $TiH_2$) is compacted to densely formed, semi-finished, precursor element). The composite of sheet metal and foam precursor is then subjected to an SPF or QPF forming technique which both forms the sheet metal and causes forming of the metal foam precursor such that it forms to a desired shape pursuant to the adjacent die formation. Alternatively, metal sheets may sandwich an intermediate metal foam precursor layer. The sandwich structure is then subjected to a QPF or SPF forming process within the die to form a deformed sheet metal sandwich. The deformed sheet metal sandwich is then heated to a temperature greater than the formation temperature so as to form the metal foam precursor. Accordingly, a single forming operation provides complex composite structures of low weight metallic composites. The composites provide excellent energy absorption properties, and dent resistance. A metal foam precursor may be adhered or fused to an underside of a sheet metal blank to form a reinforcing patch thereon. Alternatively, metallic foam precursor may be used between an upper and lower sheet metal blank prior to QPF or SPF forming thereof.

Engine Cradles

As stated earlier, consolidations similar to the one-piece floor pan may be achieved by forming an engine cradle using any of the fluid forming processes described above. Existing steel designs for engine cradles have many add on brackets such as bushing pockets due to the forming limitations of conventional forming technologies. The ability to achieve complex shapes via QPF forming allows for the bushing pockets to be integrated into the formed cradle in a single upper forming process. An engine cradle for a front wheel drive passenger vehicle may have a quadrangle shape with a pair of longitudinal arms and a pair of cross arms spaced apart from each other, with attachment mounts at corners and multiple bushing pockets. Engine cradles for other body styles may also be formed using the concepts discussed herein.

Any of the forming techniques discussed above may be used to form the cradle. For instance, single sheet QPF forming, forming a multi-thickness single membrane via a tailor welded blank, patch reinforcements, multi-material processes, a multi-material tailor welded blank process, may be used to form the cradle. Two sheet opposite direction forming may be utilized to form duplicate cradles against opposing die formations. Alternatively, if the cradle involves multi-layer sheets, two sheet opposite direction forming technology may be utilized to obtain the differing shapes of the two multi-layer sheets in one pressurization. A multi-sheet friction stir welding process may be utilized. Additionally, either of the metallic foam forming processes described above and/or the bending of QPF/SPF formed components may be utilized as desired in forming the cradle.

While the best mode for carrying out the invention has been described in detail through the above examples, those familiar with the art to which this invention relates will recognize various alternative designs and embodiments for practicing the invention within the scope of the appended claims. As such, one skilled in the art will recognize that the number, shape, composition and relative positions of the blanks, the sealing features and the pressurization chambers could be manipulated to create any number of different designs which are consistent with and within the scope of the invention.

The invention claimed is:

1. A method for manufacturing a lower body component for a vehicle, the method comprising:

forming a one-piece floor pan at least partially defining a vehicle passenger compartment; wherein said floor pan substantially extends longitudinally at least the entire length of the at least partially defined vehicle passenger compartment;

forming a one-piece reinforcement structural member; and reinforcing said one-piece floor pan with said one-piece reinforcement structural member;

simultaneously forming said one-piece floor pan and said one-piece reinforcement structural member with a pair of weldable sheet metal blanks using movable profile forming dies, including stacking said pair of weldable sheet metal blanks between said movable profile forming dies sufficiently closely together to define a common interface therebetween;

heating said movable profile forming dies so that the temperature of said stacked weldable blanks reaches a temperature sufficient for superplastic forming;

closing said profile forming dies on said stacked weldable blanks to establish a sufficient seal at said common interface to partially define an internal chamber between said stacked weldable blanks and a plurality of separate perimeter pressurization chambers inside said forming dies each positioned outside of said common interface; and supplying pressurized gas into said internal chamber and said plurality of separate perimeter pressurization chambers to increase the volume of said internal chamber and said plurality of separate perimeter pressurization chambers to simultaneously effect the stretching of said weldable blanks into said profiling dies and to thereby plastically deform said stacked weldable blanks into a lower body component and a one piece reinforcement structural member each having the profile of a different one of said profile forming dies.

2. The method of claim 1, further comprising welding said stacked weldable blanks at predetermined contact areas of said common interface either before or after being positioned between said profile forming dies.

3. The method of claim 2, wherein said welding said stacked weldable blanks at said predetermined contact areas is by friction stir welding.

4. The method of claim 2, wherein said welding of said stacked weldable blanks is by friction stir welding.

5. The method of claim 2, wherein the forming of said stacked weldable blanks is by single sheet quick plastic forming.

6. The method of claim 1, wherein said one-piece floor pan and said one-piece reinforcement structural member are each formed from a respective single metal blank.

* * * * *